(12) United States Patent
Cohen et al.

(10) Patent No.: US 9,587,125 B2
(45) Date of Patent: Mar. 7, 2017

(54) PHOTO-CURABLE INK COMPOSITION

(71) Applicant: HEWLETT-Packard Industrial Printing LTD, Netanya (IL)

(72) Inventors: Eytan Cohen, Raanana (IL); Malan Calitz, Tel Aviv (IL); Alex Trubnikov, Petach Tiqwa (IL); Alona Makarsky, HaSharon (IL)

(73) Assignee: Hewlett-Packard Industrial Printing LTD., Netanya (IL)

( * ) Notice: Subject to any disclaimer, the term of this patent is extended or adjusted under 35 U.S.C. 154(b) by 138 days.

(21) Appl. No.: 14/397,056

(22) PCT Filed: May 22, 2013

(86) PCT No.: PCT/IB2013/054239
§ 371 (c)(1),
(2) Date: Oct. 24, 2014

(87) PCT Pub. No.: WO2013/175416
PCT Pub. Date: Nov. 28, 2013

(65) Prior Publication Data
US 2015/0148440 A1    May 28, 2015

(30) Foreign Application Priority Data
May 22, 2012  (EP) .................................. 12168798

(51) Int. Cl.
| C09D 11/10 | (2014.01) |
| C09D 11/30 | (2014.01) |
| C09D 11/32 | (2014.01) |
| C08J 3/28 | (2006.01) |
| C08F 2/50 | (2006.01) |
| C09D 11/107 | (2014.01) |
| C09D 11/101 | (2014.01) |
| C09D 11/322 | (2014.01) |

(52) U.S. Cl.
CPC .......... C09D 11/107 (2013.01); C09D 11/101 (2013.01); C09D 11/30 (2013.01); C09D 11/322 (2013.01)

(58) Field of Classification Search
CPC ..... C09D 11/101; C09D 11/30; C09D 11/322; C08F 2/50; C08J 3/28
See application file for complete search history.

(56) References Cited

U.S. PATENT DOCUMENTS

| 4,888,269 A | 12/1989 | Sato et al. |
| 5,439,956 A | 8/1995 | Noguchi |
| 6,326,419 B1 | 12/2001 | Smith |
| 6,550,905 B1 | 4/2003 | Deckers |
| 7,304,095 B2 | 12/2007 | Masumi et al. |
| 7,365,105 B2 | 4/2008 | Kiefer-Liptak |
| 7,723,400 B2 | 5/2010 | Kobayashi et al. |
| 7,893,127 B2 | 2/2011 | Nagvekar et al. |
| 2004/0091645 A1 | 5/2004 | Heederik et al. |
| 2005/0080152 A1 | 4/2005 | Bergiers et al. |
| 2008/0213550 A1 | 9/2008 | Watanabe |
| 2008/0316244 A1 | 12/2008 | Lugassi et al. |
| 2009/0181182 A1 | 7/2009 | Sloan |
| 2010/0304149 A1 | 12/2010 | Loccufier et al. |
| 2012/0129972 A1* | 5/2012 | Hall ..................... C09D 11/101 522/173 |

FOREIGN PATENT DOCUMENTS

| EP | 1331251 | 7/2003 |
| EP | 2325270 | 5/2011 |
| GB | 2338212 | 12/1999 |
| JP | 60208377 | 10/1985 |
| WO | WO 2010125373 | 11/2010 |
| WO | WO 2011/135089 | 11/2011 |

* cited by examiner

Primary Examiner — Sanza McClendon
(74) Attorney, Agent, or Firm — HP Inc. Patent Department

(57) ABSTRACT

A photo-curable ink composition including an acrylic polymer or copolymer, a mono-functional monomer, a multi-functional monomer, a photo-initiator and a pigment. Also disclosed herein is a method for forming a printed article and an inkjet printing system using said photo-curable ink composition.

15 Claims, No Drawings

PHOTO-CURABLE INK COMPOSITION

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Inks used in such technologies can be liquid dispersions, solution, or emulsions and can include oil-based inks, non-aqueous solvent based inks, water-based inks and solid inks. Current inkjet printing technology involves forcing the ink drops through small nozzles by thermal ejection, piezoelectric pressure or oscillation, onto the surface of a media. The deposited ink droplets are, then, dried, e.g., using heat or forced air, or allowed to dry at ambient conditions.

Recently, curing of ink by radiation, and in particular ultraviolet (UV) curing, has become popular. In these cases, special ink is used and the image is cured by exposure to a radiation source. The uses of such radiation-curable (or photo-curable) inks and the curing process are rapidly becoming an alternative to the established conventional drying process.

However, radiation-curable (or photo-curable) ink compositions are noticeably limited among available options due to their specific features. Accordingly, investigations continue into developing ink compositions that exhibit, when printed, specific and excellent printing properties such as, for example, jetting properties as well as improved adhesion to different type of surfaces.

DETAILED DESCRIPTION

Before particular embodiments of the present disclosure are disclosed and described, it is to be understood that the present disclosure is not limited to the particular process and materials disclosed herein. It is also to be understood that the terminology used herein is used for describing particular embodiments only and is not intended to be limiting, as the scope of protection will be defined by the claims and equivalents thereof. In describing and claiming the composition and method, the following terminology will be used: the singular forms "a", "an", and "the" include plural referents unless the context clearly dictates otherwise. Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. All percents are by weight (wt %) unless otherwise indicated.

The present disclosure refers to a photo-curable ink composition containing an acrylic polymer or copolymer, a mono-functional monomer, a multi-functional monomer, a photo-initiator and a pigment. Also disclosed is a method for forming a printed article with said photo-curable ink composition and an inkjet printing system including said photo-curable ink composition. The present disclosure refers also to a method for preparing a photo-curable ink composition containing an acrylic polymer or copolymer, a mono-functional monomer, a multi-functional monomer, a photo-initiator and a pigment.

The ink composition is photo-curable (or UV-curable or radiation-curable) ink composition. Said composition is a jettable ink composition meaning thus that the ink can be used with inkjet printing device. In some examples, the ink composition is "substantially free of solvent".

The term "curing" in the context of the present disclosure refers to a process of converting a liquid, such as ink, into a solid by exposure to actinic radiation such as photo radiation, e.g., ultraviolet (UV) radiation. In the uncured state, ink compositions have a low viscosity and are readily jetted. However, upon exposure to suitable source of curing energy, for example ultraviolet (UV) light, electrons beam energy, and/or the like, there is a formation of a cross-linked polymer network. Such ink compositions are commonly referred to as "energy-curable" inks to distinguish them from "solvent-based" inks.

Photo-curable ink compositions often have poor adhesion to non-porous or low surface energy substrates such as polypropylene, polyolefins or acrylics surfaces. Polypropylene, for example, is widely used for rigid and semi-rigid Point-of-Purchase displays. Because the surface of the polypropylene is inert and has low surface energy, polar solvents will not wet it. As a result, a poor adhesion is obtained. Additionally, depending on the ink load, when printing inks on top of one another, proper cohesion between ink layers on substrate can be less than desirable. Furthermore, photo-curable ink compositions often have a viscosity that is higher than other inks such as water-based inks. The jetting of such photo-curable ink compositions can thus present certain difficulties, and further, can only be jetted at low frequencies, causing slower printing speeds. Because these inks are more viscous, they are also often jetted at elevated temperatures, e.g., above about 40° C. This elevated temperature allows some control over the inks high viscosity, but adversely affects the life of printing architecture including the printhead.

In some examples, the photo-curable ink composition as described herein can be printed in a broad selection of substrates and has a good adhesion on variety of substrates, specifically on plastic substrates such as PVC, acrylic, polycarbonate and on substrates such as polypropylene. The photo-curable ink composition has a good viscosity that enables good printing performances and enables the ability to formulate inks suitable for inkjet application. The photo-curable ink composition of the present disclosure enables thus high printing speed and is very well suited for a use in digital inkjet printing.

In some examples, the photo-curable curable ink composition can be printed on a broad selection of substrates while having excellent adhesion to these substrates, specifically on substrates such as styrenes, polystyrenes, cast acrylics, extrude acrylics, polycarbonates, polyethylenes, polypropylenes, polyesters, co-extruded polyesters, amorphous polyethylene terephthalate, rigid vinyls, polyvinyl chloride or any combination of any of these. When printed on a substrate and cured, the ink composition as described herein exhibits excellent adhesion to the substrate, specifically on rigid substrate. Such ink composition has improved adhesion to non-polar surfaces while having good jetting properties. The composition possesses also good scratch resistance and weatherability. It can support high curing speed, operational flexibility, and has a viscosity enabling good jetting properties.

In some examples, the ink composition has a viscosity at 25° C. of not greater than about 70 cps (centipoises); of not greater than about 50 cps, or, of not greater than about 30 cps. In some other examples, the viscosity of the ink composition is ranging from about 5 cps to about 25 cps at a jetting temperature of about 25° C. to about 55° C. In some other examples, the ink composition has a viscosity, at jetting temperature, ranging from about 8 cps to 20 cps. The ink composition can have a static surface tension, at 25° C., of not greater than about 40 dynes/cm.

Acrylic Polymer or Copolymer

The photo-curable ink composition encompasses an acrylic polymer or copolymer. Suitable acrylic polymer or copolymers include components such as styrene acrylic resins, butyl methacrylate resins, ethyl methacrylate, isobutyl methacrylate resins, methyl methacrylate resins, styrene acrylates or copolymers thereof in any combination. In some examples, the acrylic polymer or copolymers includes polymers of methyl methacrylate, ethyl methacrylate and butyl methacrylate or any combination thereof. In some other examples, the acrylic polymer or copolymer is an isobutyl methacrylate resin.

The acrylic polymer or copolymer component may have an average molecular weight in the range of about 1,000 to about 60,000 g/mole; or, in the range of about 5,000 to about 20,000 g/mole. In some examples, the acrylic polymer or copolymer component has a glass transition temperature (Tg) that is below 60° C. The way of measuring the glass transition temperature (Tg) parameter is described in, for example, Polymer Handbook, 3rd Edition, authored by J. Brandrup, edited by E. H. Immergut, Wiley-Interscience.

Examples of acrylic polymers or copolymers include components available from Dianal America, under tradenames: MB-7022, MB-2588, BR-115, MB-2543, BR-220, MB-2823 or MB-2494 or MB-2594 or Neocryl®300 available from DSM.

In some examples, the acrylic polymer or copolymer component is present in the ink composition in an amount representing from about 5 to about 25 wt % of the total weight of the ink composition. In some other example, the acrylic polymer or copolymer component is present in an amount representing from about 7 to about 20 wt % of the total weight of the ink composition.

Mono-Functional Monomer

The photo-curable ink composition includes a mono-functional monomer. A mono-functional monomer is a compound containing one functional group that is capable of participating in a polymerization reaction during curing of the ink or coating. In particular, the mono-functional monomer has a functional group that reacts in a free radical curing reaction.

Without being linked by any theory, it is believed that mono-functional monomer acts as a reactive diluent for the polymer or copolymer, controls viscosity, reduce shrinkage, enhance flexibility and control adhesion of the ink to the media substrate. In some examples, a combination of two or more mono-functional monomers is used in the photo-curable ink composition in view of optimizing ink properties.

Mono-functional monomer can be acrylate, methacrylate or vinyl monomer. In some examples, the mono-functional monomer is selected from the group consisting of acrylic, methacrylic, vinyl type monomers and any combination of these.

The acrylate monomer can also be modified or derivatized acrylate monomer. The acrylic monomer can be selected from the group consisting of 2-phenoxyethyl acrylate, isophoryl acrylate, isodecyl acrylate, tridecyl acrylate, lauryl acrylate, 2-(2-ethoxy-ethoxy)ethyl acrylate, tetrahydrofurfuryl acrylate, isobornyl acrylate, propoxylated acrylate, tetrahydrofurfuryl methacrylate, 2-phenoxyethyl methacrylate, isobornyl methacrylate and combinations of two or more thereof. In some examples, mono-functional monomers are vinyl monomers. Such vinyl monomer can be selected from the group consisting of vinyl caprolactam and divinyl ether and any combinations thereof. In some examples, the mono-functional monomer is selected from the group consisting of vinyl caprolactam, tetrahydrofurfuryl acrylate, 2-phenoxyethyl acrylate and isophoryl acrylate.

Commercially available mono-functional monomers include, for example, Isophoryl Acrylate CD 420 or 2-Phenoxyethyl Acrylate SR 339C (from Sartomer USA, LLC).

The mono-functional monomer can be present in the ink composition at a level of about 1 to about 50% by weight based on the total weight of the ink. In some examples, the mono-functional monomer is present in an amount representing from about 5 to about 15 wt % based on the total weight of the ink composition.

Multi-Functional Monomer

The photo-curable ink composition includes a multi-functional monomer. A multi-functional monomer is a compound containing more than one functional groups that are capable of participating in the curing reaction, for example a polymerization reaction, during curing of the ink. Without being linked by any theory, it is believed that multi-functional monomer enhances curing speed of the composition and may serve as a reactive diluent for the polymer or copolymer. In some examples, a combination of two or more multi-functional monomers may be used to optimize ink properties.

In particular, the multi-functional monomer includes more than one functional group that reacts in a free radical curing reaction, such as an ethylenically unsaturated functional group, for example a vinyl or acrylate functional group. The term "multi-functional monomer" refers to the monomer, other than mono-functional monomer, containing more than one polymerizable functional group per molecule. The multi-functional monomer can be a di-functional monomer, i.e. containing two polymerizable functional groups per molecule.

The multi-functional monomer can be acrylate monomer containing ethylenically unsaturated radiation curable functional groups. Examples of such functional, radiation curable monomer may include 3-methyl 1,5-pentanediol diacrylate, hexanediol di(meth)acrylate, tetraethylene glycol di(meth)acrylate, trimethylolpropane tri(meth)acrylate, ethoxylated trimethylolpropane tri(meth)acrylate, tris(2-hydroxyethyl) isocyanurate triacrylate, pentaerythritol tri(meth)acrylate, ethoxylated (4) pentaerythritol tetraacrylate, neopentyl glycol di(meth)acrylate, combinations of these, and the like.

In some other examples, the multi-functional monomer is selected from the group consisting of ethoxylated (4) pentaerythritol tetraacrylate, tetraethylene glycol diacrylate, propoxylated ethylene glycol di-acrylate, dipentaerythritol penta-acrylate and their combinations. The multi-functional monomer can also be selected from the group of monomers consisting of acrylic and methacrylic type monomers and any combination of these.

In some examples, the multi-functional monomer is present in an amount representing from about 1 to about 30 wt % of the total weight of the photo-curable ink composition. In some other example, the multi-functional monomer is present in an amount representing from about 5 to about 15 wt % of the total weight of the ink composition.

Photo-Initiator

In some examples, the ink composition contains a photo-initiator. The photo-initiator, or UV initiator, is an agent that initiates a reaction upon exposure to a desired wavelength of UV light to cure the ink composition, as described herein, after its application to an ink-receiving material or substrate. In some examples, the photo-initiator is a radical photo-initiator. The photo-initiator may be a single compound or a mixture of two or more compounds. It can be present in the ink composition in an amount sufficient to cure the applied ink composition. In some examples, the photo-initiator is present in the ink composition in an amount representing from about 0.01 to about 10 wt %, or from about 1 to about 5 wt % by weight, based on the total weight of the photo-curable ink composition.

Examples of radical photo-initiator include, by way of illustration and not limitation, 1-hydroxy-cyclohexylphenylketone, benzophenone, 2,4,6-trimethylbenzo-phenone, 4-methylbenzophenone, diphenyl-(2,4,6-trimethylbenzoyl) phosphine oxide, phenyl bis(2,4,6-trimethylbenzoyl)phosphine oxide, 2-hydroxy-2-methyl-1-phenyl-1-propanone, benzyl-dimethyl ketal, 2-methyl-1-[4-(methylthio)phenyl]-2-morpholinopropan-1-one, or combinations of two or more of the above. Amine synergists may also be used, such as, for example, ethyl-4-dimethylaminobenzoate, 2-ethylhexyl-4-dimethylamino benzoate.

The photo-curable ink composition may include a UV stabilizer, i.e. an agent that can assist with scavenging free radicals. Examples of UV stabilizers include, by way of illustration and not limitation, quinine methide (Irgastab®UV 22 from BASF Corporation) and Genorad®16 (Rahn USA Corporation) and combinations thereof.

In some examples, a photosensitizer may be used with the photo-initiator in amounts ranging from about 0.01 to about 10 wt %, or from about 1 to about 5 wt %, based on the total weight of the ink composition. A photosensitizer absorbs energy and then transfers it to another molecule, usually the photo-initiator. Photosensitizers are often added to shift the light absorption characteristics of a system. Suitable examples of photosensitizers include, but are not limited to thioxanthone, 2-isopropylthioxanthone and 4-isopropylthioxanthone.

Pigment

The ink compositions may include one or more pigments as colorants. Insoluble pigment colorants can assist in achieving a better image performance. The pigments can be self-dispersed pigments, polymer-coated pigments, or common pigments such as milled pigments, for example. A separate dispersing agent may be used to enable appropriate suspension of the pigment in the ink composition. The particulate pigment may be inorganic or organic. The pigment can be of any color including, but not limited to, black, blue, brown, cyan, green, white, violet, magenta, red, orange and yellow, as well as spot colors from mixtures thereof.

Examples of organic pigments that may be present in the photo-curable ink composition include, by way of illustration and not limitation, perylenes, phthalocyanine pigments (for example, phthalo green, phthalo blue), cyanine pigments (Cy3, Cy5, and Cy7), naphthalocyanine pigments, nitroso pigments, monoazo pigments, diazo pigments, diazo condensation pigments, basic dye pigments, alkali blue pigments, blue lake pigments, phloxin pigments, quinacridone pigments, isoindolinone pigments, dioxazine pigments, carbazole dioxazine violet pigments, alizarine lake pigments, phthaloxy amine pigments, carmine lake pigments, tetrachloroisoindolinone pigments, perinone pigments, thioindigo pigments, anthraquinone pigments and quinophthalone pigments, and mixtures of two or more of the above and derivatives of the above.

Inorganic pigments that may be present in the ink composition, include, for example, metal oxides (for example, titanium dioxide, electrically conductive titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides, metal chlorides, and mixtures of two or more thereof.

Examples of pigment colorants that may be employed include, by way of illustration and not limitation, yellow pigments having the following Yellow Pigment color index PY 83, PY 151, PY 150, PY 155, PY 139, PY120, PY180, PY 129 and PY 154, PY213. Magenta pigments composed of Red pigment having color indices of PR 202, PR 254, PR 122, PR149, PR185, PR255, PR146 and Violet pigment having color indices of PV 19, PV 23, PV37 and PV 29 may be used. Blue pigments having color indices of PB 15:3, PB 15:4, PB 15:2 and PB 15:1, as well as black pigments having color indices of PBL Black 7 also may be utilized. Inorganic pigment such as a white pigment of the type $TiO_2$ also may be used. Orange pigment having color indices of PO46, PO64, PO34 as well as green pigments having color index of PG7 also may be employed.

The pigment component can be a dispersible pigment, such as, for example, pigment available under the trade names Paliotol®, Heliogen®, Chromophtal®, Irgalite®, Cinquasia® (available from BASF), Hostaperm®, Novoperm® (available from Clariant), Sunfast®, Quindo® (available from SunChemical), Special Black (available from Degussa), Kronos® (available from Kronos), Kemira® (available from Kemira Pigments).

The amount of the pigment in the photo-curable ink composition depends on a number of factors, for example, the nature of the pigment, the nature of the use of the ink composition, the nature of the jetting mechanism for the ink, and the nature of any additives, for example. The ink composition may contain up to 20 wt % of pigment. In some example, the amount of pigment in the photo-curable ink composition is from about 0.1 to about 20 wt %, or from about 1 to about 15 wt %, or from about 5 to about 10 wt %.

Other Components and Additives

Other components and additives may be present in the photo-curable ink composition in order to improve ink properties and performances. The additives include, but are not limited to, one or more of surfactants or wetting agents (e.g., surfactants containing silicone compounds or fluorinated compounds), dispersing agents, rheology modifiers, anti-molding agents, anti-foaming agents, and stabilizers such as, e.g., storage stability enhancing agents, for example. The total amount by weight of additives in the ink composition is, for example, from about 0.1 to about 1 wt % or, from about 0.2 to about 0.5 wt %.

Surfactants include, for example, those commercially available under the brand names: WET® and GLIDE® (from Evonik Tego Chemie GmbH, Essen, Germany); BYK® (from BYK Chemie GmbH, Wesel, Germany);

Dynax®(from Dynax Corp. Pound Ridge N.Y.); 3M Novec® (from 3M Energy and Advanced Materials, St. Paul Minn.); and Zonyl® FSO (from DuPont de Nemours Company, Wilmington Del.).

Examples of anti-foaming agents are those commercially available under the brand names: Foamex® and Twin® (from Evonik Tego Chemie Service GmbH); BYK® (from BYK Chemie GmbH); and Surfynol® (from Air Products and Chemicals, Inc.).

Examples of dispersants include high molecular weight copolymers with groups having an affinity for a pigment. Specific examples of dispersants include those commercially available from BYK Chemie GmbH under the brand names BYK®.

Examples of rheology modifiers include, those commercially available under the brand names: Acrysol® (from Rohm & Haas); Borchigel® (from OMG Borchers GmbH, Langenfield, Germany); BYK® (from BYK Chemie GmbH); and DSX® (from Cognis GmbH, Monheim am Rhein, Germany).

Method for Forming a Printed Article and Printing System

In accordance with the principles described herein, the photo-curable ink compositions find use as inkjet inks for inkjet printers. In some examples, the photo-curable ink compositions may be dispensed to the surface of a broad range of substrates employing inkjet technology and equipment.

In some embodiments, a method for forming a printed article includes: providing a photo-curable ink composition containing an acrylic polymer or copolymer, a mono-functional monomer, a multi-functional monomer, a photo-initiator and a pigment; providing a media substrate; jetting said photo-curable ink composition onto the media substrate; and applying photo energy to the ink composition once printed on the media substrate, said photo energy having a frequency and energy level suitable for curing the photo-curable ink composition.

In some examples, the projection of stream of droplets of ink composition, onto the media substrate, is done via inkjet printing technique. The ink composition may be established on the material via any suitable printing technique, such techniques include thermal, acoustic, continuous and piezoelectric inkjet printing. In inkjet printing devices, liquid ink drops are applied in a controlled fashion to an ink-receiving substrate, or media substrate, by ejecting ink droplets from a plurality of nozzles, or orifices, in a printhead of an inkjet printing device or inkjet printer. In drop-on-demand systems, a droplet of ink is ejected from an orifice directly to a position on the surface of an ink-receiving substrate, or media substrate, by pressure created by, for example, a piezoelectric device, an acoustic device, or a thermal process controlled in accordance digital data signals. For inkjet printing, the ink composition can be heated or chilled to an appropriate dispensation temperature, prior to ejecting the ink composition to the surface of a substrate. Considerations regarding temperature and viscosity of the ink composition relate to the effect on droplet size and droplet ejecting rate, for example.

For applying photo energy, the photo-curable ink composition, on the media substrate, may be subjected to suitable light sources for curing the ink compositions in accordance with the principles described herein. Ultraviolet (UV) radiations can be used to cure the ink composition as described above. Curing radiation can be UV radiation radiated by UV lamps, blue lasers, UV lasers, or ultraviolet LEDs, for example. The curing radiation may be provided by a source of ultraviolet radiation operating in a continuous mode. The curing radiation may also be provided by a source of ultraviolet operating in a flash or pulsed mode.

As mentioned, the photo-curable ink composition is jetted onto a media substrate. The media substrate may be planar, either smooth or rough, or have any other shape that is suitable for the particular purpose for which it is employed. The media substrate can have a thickness in the range of about 0.1 mm to about 10 mm or in the range of about 1 mm to about 5 mm. The media substrate may be porous or non-porous, rigid, semi-rigid, or flexible, for example. Planar media substrates may be in the form, for example, of a film, plate, board, or sheet by way of illustration and not limitation.

Examples of media substrate include, but are not limited to, plastic substrates (for example, polyethylene terephthalate, polyethylene, polystyrene, polypropylene, polycarbonate, and acrylic), paper, paper laminated with plastic (for example, polyethylene, polypropylene, or polystyrene), cardboard, paperboard, foam board, and textiles. The media can also be rigid PVC (polyvinylchloride rigid substrate) or PETG (Polyethylene Terephthalate Glycol-modified).

In some examples, the media substrate is non-porous and has low surface tension. Non-limiting examples include plastics, PVC, banner paper, and polypropylenes, and synthetic paper, such as Yupo® synthetic paper. Banner paper is specifically configured for printing banners, has a smooth surface, and is often designed for color printing. The term "non-porous" includes surfaces that can have relatively poor water permeability, absorption, and/or adsorption. Vinyl and other plastic sheets or films, metals, coated offset media, glass, and other similar substrates are considered non-porous.

The media substrate can be a plastic substrate. In some embodiment, the media substrate is a rigid plastic substrate. In some examples, the media substrate is a polypropylene, a polyvinyl chloride (PVC), an acrylic or a polycarbonate substrate. In some other examples, the media substrate is a polypropylene substrate. In yet some other examples, the media substrate is an acrylic substrate.

The media substrates can be non-swellable and/or are non-polar. By non-swellable, it is meant herein that the substrate surface is not swelled by any components of the ink, and no chemical bonds are formed between ink and substrate. By non-polar, it is meant herein that the substrate surface is charge-neutral, therefore adhesion to it is difficult to achieve.

In some embodiments, the present disclosure refers to an inkjet printing system that include a media substrate; at least one photo-curable ink composition containing an acrylic polymer or copolymer, a mono-functional monomer, a multi-functional monomer, a photo-initiator and a pigment; and a photo energy source configured to apply photo energy to the ink composition once printed on a substrate, said photo energy having a frequency and energy level suitable for curing the photo-curable inkjet ink. In some examples, the photo energy source is a UV light source having a frequency and energy level suitable for curing the photo-curable inkjet ink.

In some other embodiments, the present disclosure refers to method for preparing the above mentioned photo-curable ink composition. The method includes providing, in combination, an acrylic polymer or copolymer, a mono-functional monomer, a multi-functional monomer, a photo-initiator and a pigment; subjecting the combination to conditions under which the ink composition becomes substantially uniform and have viscosity and surface tension suitable for jetting; and subjecting the combination to filtration. The photo-curable ink composition can be prepared by dissolving an acrylic polymer or copolymer in mono-functional monomer under high-shear. The resulting solution can then be mixed with multi-functional monomer and pigment preparation (millbase), which is prepared separately by milling the pigment with dispersing agent and vehicle (multi-functional monomer) in a bead mill. The photo-initiator system can be added to the mix. The mixture is subsequently subjected to high shear mixing in view of dissolving the photo-initiator. The mixture becomes uniform and can be subjected to filtration.

EXAMPLES

1—List of Ingredients

TABLE A

| Component name | Ingredient type | Supplier |
|---|---|---|
| MB-2594 | Acrylic polymer | Dianal America |
| Neocryl® 300 | Acrylic polymer | DSM |
| Genorad® 16 | Stabilizer | RAHN |
| Irgacure® 819 | Photo-initiator | BASF Corporation |
| BMS | Photo-initiator | Lambson |
| Irgacure® TPO | Photo-initiator | BASF Corporation |
| Darocur® ITX | Photo-initiator | BASF |
| Irgalite® GLVO | Cyan pigment | BASF Corporation |
| J200® | Dispersant | Lubrizol Corp. |
| BYK 307® | surfactant | BYK |
| Genomer® 5275 | multi-functional oligo-amine (oligomer) | Rahn |
| dipentaerythritolpentaacrylate (SR399LV) | multi-functional monomer | Sartomer |
| Tetraehylene glycol diacrylate (SR 268) | multi-functional monomer | Sartomer |
| Propoxylated neopentylglycol diacrylate (SR 9003) | multi-functional monomer | Sartomer |
| 1.4 butandiol diacrylate (EM 2241) | multi-functional monomer | Eternal |
| 1.6-Hexanediol diacrylate (SR 238) | multi-functional monomer | Sartomer |
| Dipropyleneglycol diacrylate (SR 508) | multi-functional monomer | Sartomer |
| Isophoryl Acrylate (CD420) | mono-functional monomer | Sartomer |
| 2-Phenoxyethyl Acrylate (SR339C) | mono-functional monomer | Sartomer |
| Vinyl caprolactam | mono-functional monomer | BASF |
| Tetrahydrofurfuryl acrylate (SR 285) | mono-functional monomer | Sartomer |

2—Ink Formulations

Different photo-curable ink compositions are prepared. Ink formulations #1 and #2 are in accordance with embodiments of the present disclosure. Ink formulations #3 to #7 are comparative ink compositions. Ink formulations 1 to 7 are illustrated in the TABLE (B) below. All percentages are expressed in wt % of the total composition.

TABLE B

| Ink formulation | 1 | 2 | 3 | 4 | 5 | 6 | 7 |
|---|---|---|---|---|---|---|---|
| MB-2594 | — | 13 | — | 13 | 13 | 13 | 13 |
| Neocryl® 300 | 8.4 | — | — | — | — | — | — |
| Genorad® 16 | 0.5 | 0.5 | 0.5 | 0.5 | 0.5 | 0.5 | 0.5 |
| Irgacure® 819 | 0.4 | 0.4 | 0.4 | 0.4 | 0.4 | 0.4 | 0.4 |
| BMS | 3 | 3 | 3 | 3 | 3 | 3 | 3 |
| Irgacure® TPO | 4 | 4 | 4 | 4 | 4 | 4 | 4 |
| Darocur® ITX | 2 | 2 | 2 | 2 | 2 | 2 | 2 |
| Irgalite® GLVO | 2.1 | 2.1 | 2.1 | 2.1 | 2.1 | 2.1 | 2.1 |
| J200 | 0.9 | 0.9 | 0.9 | 0.9 | 0.9 | 0.9 | 0.9 |
| BYK 307® | 0.2 | 0.2 | 0.2 | 0.2 | 0.2 | 0.2 | 0.2 |
| Genomer® 5275 | 2 | 2 | 4 | — | 2 | 2 | 2 |
| CD420 | 24.5 | 24.5 | 24.5 | 24.5 | — | — | — |
| SR339C | 12.2 | 12.2 | 14.6 | 16.2 | — | — | — |
| Vinyl caprolactam | 20 | 11.7 | 20 | 22 | — | — | — |
| Tetrahydrofurfuryl acrylate | 15.8 | 19.5 | 15.8 | 11.2 | — | — | — |
| SR399LV | 4 | 4 | 8 | — | 4 | 4 | 4 |
| Tetraehylene glycol diacrylate | — | — | — | — | 20 | — | — |
| Propoxylated neopentylglycol diacrylate | — | — | — | — | — | 20 | — |
| 1.4 butandiol diacrylate | — | — | — | — | — | — | 20 |
| 1.6-Hexanediol diacrylate | — | — | — | — | 20 | 20 | 20 |
| Dipropyleneglycol diacrylate | — | — | — | — | 27.9 | 27.9 | 27.9 |

Ink formulations #1 and #2 are prepared. Acrylic polymers MB2594 or Neocryl 300 are added, as a 40 wt % solution in THFA. Cyan pigment (Irgalite®GLVO) is milled with dispersants (J200) in a bead mill using CD420 as a milling vehicle. The dispersion is then added to the other ingredients in view of obtaining the ink formulations #1 and #2 as presented in TABLE (B).

Comparative ink formulation #3 is prepared. This formulation does not contain acrylic polymer or copolymer. Cyan pigment (Irgalite®GLVO) is milled with dispersants (J200) in a bead mill using CD420 as a milling vehicle. The dispersion is then added to the other ingredients in view of obtaining the ink formulation #3 as presented in TABLE (B).

Comparative ink formulation #4 is prepared. This formulation does not contain multi-functional monomer. Cyan pigment (Irgalite®GLVO) is milled with dispersants (J200) in a bead mill using CD420 as a milling vehicle. The dispersion is then added to the other ingredients in view of obtaining the ink formulation #4 as presented in TABLE (B).

Comparative ink formulations #5, #6 and #7 are prepared. These formulations do not contain mono-functional monomer. Cyan pigment (Irgalite®GLVO) is milled with dispersants (J200) in a bead mill using CD420 as a milling vehicle. The dispersion is then added to the other ingredients in view of obtaining the ink formulations #5, #6 and #7 as presented in TABLE (B).

3—Ink Testing Procedures

Viscosity testing: The viscosity of the inkjet ink formulations is determined using a HAAKE RS-600 rheometer (Thermo Electron, Newington N.H.) and a TCP/P Peltier controlled unit (Thermo Electron). The viscosity is measured at different temperatures, 50° C. or 40° C. The results are recorded at a shear rate of 4000 l/sec. (Inkjet printheads can handle inks with viscosities from about 4-8 cps to about 18-25 cps at normal jetting temperatures. The jetting temperature cannot be too high; otherwise, it affects thermal stability of the UV-curable inks. UV-curable inks are not heated with temperature above 50-55° C.).

Adhesion testing: The adhesion to various substrates is determined according to the standard method ASTM#D3359/97. The tested substrates are polypropylene (Coroplast®, untreated); rigid PVC; transparent acrylic (polymethylmethacrylate) and polycarbonate. The ink sample is applied to the substrate by draw-down using K Control Coater (available from K Print-Coat Instruments Ltd). The wet thickness of applied layer is 12 µm. The ink is then irradiated under the UV lamp until cured. The adhesion is tested immediately after curing using cross hatch tester (Elcometer 1542 6×1 mm) and 3M Scotch tape grade 250. The adhesion is evaluated visually and is scored on a scale of 1 to 5 where: a score of 1 illustrates a very poor adhesion to substrate, a score of 2 illustrates a poor adhesion, a score of 3 illustrates a fair adhesion, a score of 4 illustrates a good adhesion and a score of 5 illustrates a very good adhesion to substrate.

Curing speed testing: The curing speed of the inkjet ink samples is determined using LC6B bench top conveyer with LH6 UV curing system (available from Fusion UV systems Inc., Gaithersburg Md.). The ink sample is applied to self-adhesive vinyl by draw down using K Control Coater (available from K Print-Coat Instruments Ltd., Litlington, UK) in a thickness of 12 microns. The ink is irradiated once under the UV lamp at different conveyer speeds. The cured ink film is tested by scratching using a paper clip immediately after each pass. The highest speed at which ink could not be scratched is reported as the curing speed.

4—Test Results

The results of the test described above, done with the ink formulations #1 and #2 and with comparative ink formulations #3 to #7 are illustrated in TABLE (C).

TABLE C

| Ink formulations | #1 | #2 | #3 | #4 | #5 | #6 | #7 |
|---|---|---|---|---|---|---|---|
| Viscosity (cps) at 50° C. | 11 | 11.2 | 10.5 | 9.8 | 29.7 | 31.2 | 27.3 |
| Curing speed (m/s) | 2.1 | 2.1 | 2.2 | 1.2 | 1.8 | 1.8 | 1.8 |
| Adhesion to polypropylene | 5 | 5 | 0 | 5 | 2 | 2 | 2 |
| Adhesion to rigid PVC | 5 | 5 | 5 | 5 | NA | NA | NA |
| Adhesion to transparent acrylic | 5 | 5 | 0 | 5 | NA | NA | NA |
| Adhesion to polycarbonate | 5 | 5 | 3 | 5 | NA | NA | NA |

These results demonstrate that ink formulations #1 and #2 have good printing characteristic, i.e. they can be jetted normally, have very high curing speed and excellent adhesion to all tested substrates. Comparative ink formulations #3 have high curing speed but no adhesion to polypropylene and acrylic substrates and poor adhesion to polycarbonate. Comparative ink formulation #4 has excellent adhesion properties, specifically on polypropylene and on transparent acrylic, but has a very low curing speed.

Comparative ink formulation #5, #6 and #7 do not have good adhesion and have low curing speed. These ink compositions also have a very high viscosity that affects printing performance and jettability as well as thermal stability.

The invention claimed is:

1. A photo-curable ink composition, comprising:
   a. an acrylic polymer or copolymer,
   b. a mono-functional monomer,
   c. a multi-functional monomer present in an amount representing from about 5 wt % to about 30 wt % of a total weight of the ink composition,
   d. a photo-initiator,
   e. and a pigment;
   wherein the mono-functional monomer is isophoryl acrylate.

2. The photo-curable ink composition, according to claim 1, wherein the mono-functional monomer is present in an amount representing from about 5 wt % to about 15 wt % of the total weight of the ink composition.

3. The photo-curable ink composition, according to claim 1, wherein the multi-functional monomer is acrylate monomer containing ethylenically unsaturated radiation curable functional groups.

4. The photo-curable ink composition, according to claim 1, wherein the multi-functional monomer is selected from the group consisting of ethoxylated (4) penta-erythritol tetra-acrylate, tetraethylene glycol diacrylate, propoxylated ethylene glycol diacrylate, dipentaerythritol penta-acrylate and their combinations.

5. A photo-curable ink composition, comprising:
   a. an acrylic polymer or copolymer,
   b. a mono-functional monomer,
   c. a multi-functional monomer,
   d. a photo-initiator,
   e. and a pigment;
   wherein the mono-functional monomer is isophoryl acrylate, and wherein the acrylic polymer or copolymer is an isobutyl methacrylate resin.

6. The photo-curable ink composition, according to claim 5, wherein the composition has a viscosity, at jetting temperature, that is ranging from about 5 cps to 25 cps.

7. The photo-curable ink composition, according to claim 5, wherein the multi-functional monomer is present in an amount representing from about 1 wt % to about 30 wt % of the total weight of the ink composition.

8. A method for forming a printed article, comprising:
   a. providing a photo-curable ink composition containing an acrylic polymer or copolymer, a mono-functional monomer, a multi-functional monomer, a photo-initiator and a pigment, wherein the acrylic polymer or copolymer is an isobutyl methacrylate resin and wherein the mono-functional monomer is isophoryl acrylate;
   b. providing a media substrate;
   c. jetting said photo-curable ink composition onto the media substrate;
   d. applying photo energy to the ink composition once printed on the media substrate, said photo energy having a frequency and energy level suitable for curing the photo-curable ink composition.

9. The method for forming a printed article of claim 8, wherein the media substrate is a rigid plastic substrate.

10. An inkjet printing system, comprising:
    a. a media substrate;
    b. at least one photo-curable ink composition comprising an acrylic polymer or copolymer, a mono-functional monomer, a multi-functional monomer, a photo-initiator and a pigment, wherein the acrylic polymer or copolymer is an isobutyl methacrylate resin and wherein the mono-functional monomer is isophoryl acrylate; and
    c. a photo energy source configured to apply photo energy to the ink composition once printed on a substrate, said photo energy having a frequency and energy level suitable for curing the photo-curable inkjet ink.

11. The inkjet printing system of claim 10, wherein the photo energy source is a UV light source.

12. A method for preparing a photo-curable ink composition, comprising:
    a. providing in combination an acrylic polymer or copolymer, a mono-functional monomer, a multi-functional monomer, a photo-initiator and a pigment, wherein the acrylic polymer or copolymer is an isobutyl methacrylate resin and the mono-functional monomer is isophoryl acrylate;

b. subjecting the combination to conditions under which the ink composition becomes substantially uniform;

c. and subjecting the combination to filtration.

13. The photo-curable ink composition, according to claim 5, wherein the multi-functional monomer is an acrylate monomer containing ethylenically unsaturated radiation curable functional groups.

14. The photo-curable ink composition, according to claim 5, wherein the multi-functional monomer is selected from the group consisting of ethoxylated (4) penta-erythritol tetra-acrylate, tetraethylene glycol diacrylate, propoxylated ethylene glycol diacrylate, dipentaerythritol penta-acrylate and their combinations.

15. The photo-curable ink composition, according to claim 5, wherein the mono-functional monomer is present in an amount representing from about 5 wt % to about 15 wt % of the total weight of the ink composition.

* * * * *